United States Patent
Kamada et al.

(10) Patent No.: US 6,548,211 B1
(45) Date of Patent: Apr. 15, 2003

(54) NEGATIVE ELECTRODE PLATE FOR LEAD STORAGE BATTERY

(75) Inventors: Akira Kamada, Kyoto (JP); Masahiko Kosai, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 0 days.

(21) Appl. No.: 08/859,430

(22) Filed: May 20, 1997

(30) Foreign Application Priority Data

May 20, 1996 (JP) ............................................. 8-149947

(51) Int. Cl.[7] ............................. H01M 4/14; H01M 4/62
(52) U.S. Cl. ...................................... 429/225; 429/232
(58) Field of Search ................................. 429/225, 232, 429/233, 235, 237

(56) References Cited

U.S. PATENT DOCUMENTS

| | | | |
|---|---|---|---|
| 4,146,401 A | * 3/1979 | Yamada et al. | 264/105 |
| 4,457,988 A | 7/1984 | Ryeczek | |
| 4,631,241 A | 12/1986 | Kawanami | 429/225 |
| 5,156,935 A | * 10/1992 | Hohjo et al. | 429/225 |
| 5,223,352 A | * 6/1993 | Pitts et al. | 429/225 |
| 5,510,213 A | 4/1996 | Gagnon et al. | 429/225 |
| 5,518,189 A | * 5/1996 | Grondin et al. | 241/20 |
| 6,019,802 A | * 2/2000 | Ishizuka et al. | 29/623.5 |

FOREIGN PATENT DOCUMENTS

| | | |
|---|---|---|
| EP | 0 352 115 | 1/1990 |
| JP | 56-36862 | 8/1979 |

OTHER PUBLICATIONS

Patent Abstracts of Japan, vol. 014, No. 012 (E–871), Jan. 11,1989 & JP 01 258361 A (Japan Storage Battery Co., Ltd), Oct. 16, 1989, *Abstract.

* cited by examiner

Primary Examiner—Stephen J. Kalafut
(74) Attorney, Agent, or Firm—Sughrue Mion, PLLC

(57) ABSTRACT

Graphite powder having a mean particle size not larger than 30 μm is added to a negative electrode plate for a lead storage battery. Preferably, the amount of graphite powder added is in the range of from 0.3% to 2% by weight. Preferably, vein powder is used as the graphite powder. More preferably, 0.3% or more by weight of an organic expander is added.

1 Claim, 3 Drawing Sheets

NEGATIVE ELECTRODE PLATE FOR LEAD STORAGE BATTERY

BACKGROUND OF THE INVENTION

1. Field of the Invention

The present invention relates to an improvement in a negative electrode plate for a lead storage battery.

2. Description of the Related Art

Lead storage batteries are used for a lot of purposes widely from starting/lighting batteries for cars and small-capacity consumer batteries to large-capacity stationary batteries. Further, recently, the lead storage battery has attracted public attention also as an electric source for an electric car from the point of view of environmental problems.

The battery for an electric vehicle requires a large current and repetition of deep charging and discharging. Further, because the battery is arranged in a narrow space in order to maximize the interior space of a car, release of heat becomes insufficient. As a result, the battery is exposed to a high temperature. Accordingly, in the battery for an electric car, the high-rate discharging characteristic of the negative electrode may be lowered in a relatively early stage.

Generally, an organic expander, an inorganic expander (barium sulfate) and carbon are added to a negative electrode plate for a lead storage battery so that they contribute to improvement in various performances of the negative electrode plate for a lead storage battery. Of these added materials, the organic expander is generally constituted by a by-product called lignin (or lignin derivatives) obtained at the time of production of pulp, so that the organic expander suppresses the contraction of the active material and finely divide the active material to thereby prevent the lowering of the discharging capacity of the negative electrode plate, especially, the lowering of the high-rate discharging capacity of the negative electrode plate with the charging/discharging of the battery.

In the conventional negative electrode plate, it was difficult to obtain life performance satisfactory for use under a high temperature, for example, in application to a lead storage battery for an electric vehicle as described above. This suggests that the amount of lignin decreases due to decomposition or dissolution to an electrolyte when lignin is exposed to a high temperature.

As one of measures to solve this problem, increase of the amount of lignin added was considered. When the amount of lignin was increased, however, there arose a problem that the capacity was lowered rather in an early stage because charge acceptance after discharging was lowered to bring about a failure in charging so that lead sulfate accumulated in the negative electrode active material.

SUMMARY OF THE INVENTION

It is an object of the present invention to provide a negative electrode plate for a lead storage battery capable of preventing the lowering of the life performance even under a high temperature.

In the present invention, graphite powder having a mean particle size equal to or not larger than 30 $\mu$m is added into the negative electrode plate of the lead storage battery. Further, the mean particle size of the graphite powder is equal to or not smaller than 0.5 $\mu$m in the present invention, because if it is less than 0.5 $\mu$m, the conductivity of the graphite can not sufficiently obtained. Moreover, the mean particle size of the graphite powder is preferably in the range of 5 to 30 $\mu$m. The amount of graphite powder added is preferably in the range of 0.3 to 2% by weight, preferably, 0.3 to 0.8% by weight, and preferably crystalline graphite powder is used as the graphite powder. Incidentally, crystalline graphite includes flake graphite and vein graphite. Vein graphite is more preferable. More preferably, 0.3% by weight or more of an organic expander is added thereto.

According to the present invention, not only the performance of the battery can be improved but also the lowering of the high-rate discharging capacity under a high temperature can be prevented.

DETAILED DESCRIPTION OF THE INVENTION

Figure 1:
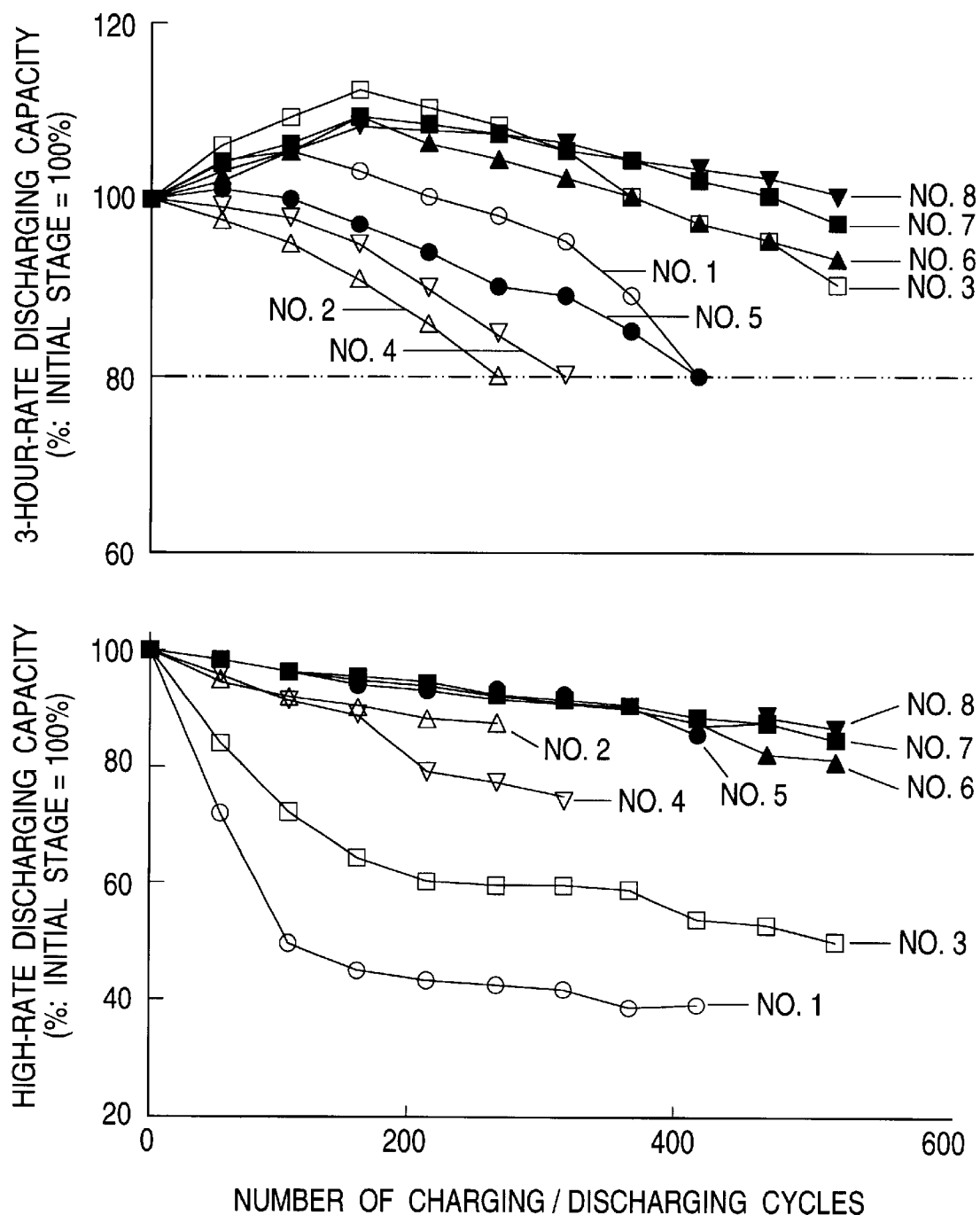
FIG. 1 shows results of a life test in Example 1.

The detailed description of the present invention will be described referring to the accompanying drawings as follows.

The lead storage battery according to the present invention is produced by an ordinary method after graphite powder having a mean particle size equal to or not larger than 30 $\mu$m is added to a negative electrode plate. Preferably, the amount of graphite powder added is in the range of 0.3 to 2% by weight and vein graphite powder is used as the graphite powder. More preferably, 0.3% by weight or more of an organic expander is added thereto. Therefore, not only the performance of the battery can be improved but also the lowering of the high-rate discharging capacity under a high temperature can be prevented.

The details of the present invention will be described below on the basis of examples thereof.

Example 1

As the organic expander, used was Na salt of sulfite lignin (hereinafter referred to as lignin) produced by a sulfite method. The amount of lignin added was changed (0.1%, 0.5% by weight as the ratio of the negative electrode active material). As the carbon, used was acetylene black, thermal black and vein graphite powder (hereinafter referred to as graphite) which has a mean particle size in a range of from 5 70 $\mu$m. The amount of the carbon added was changed (0.2%, 1% by weight). These were variously combined to obtain eight kinds of negative electrode plates shown in Table 1.

TABLE 1

| NEGATIVE ELECTRODE NO. | AMOUNT OF ADDED LIGNIN (wt %) (RATIO RELATIVE TO NEGATIVE ELECTRODE ACTIVE MATERIAL) | KIND AND AMOUNT OF ADDED CARBON [(wt %) (RATIO RELATIVE TO NEGATIVE ELECTRODE ACTIVE MATERIAL) | NOTE |
|---|---|---|---|
| 1 | 0.1 wt % | 0.2 wt % OF ACETYLENE BLACK | CONVENTIONAL ARTICLE |
| 2 | 0.5 wt % | 0.2 wt % OF ACETYLENE BLACK | COMPARATIVE EXAMPLE |
| 3 | 0.5 wt % | 1.0 wt % OF ACETYLENE BLACK | COMPARATIVE EXAMPLE |
| 4 | 0.5 wt % | 1.0 wt % OF THERMAL BLACK | COMPARATIVE EXAMPLE |
| 5 | 0.5 wt % | 1.0 wt % OF GRAPHITE WITH MEANS PARTICLE SIZE OF 70 μm | COMPARATIVE EXAMPLE |
| 6 | 0.5 wt % | 1.0 wt % OF GRAPHITE WITH MEANS PARTICLE SIZE OF 30 μm | EXAMPLE |
| 7 | 0.5 wt % | 1.0 wt % OF GRAPHITE WITH MEANS PARTICLE SIZE OF 10 μm | EXAMPLE |
| 8 | 0.5 wt % | 1.0 wt % OF GRAPHITE WITH MEANS PARTICLE SIZE OF 5 μm | EXAMPLE |

That is, 100 kg of leady oxides containing about 75% by weight of PbO and about 25% by weight of metallic Pb and having apparent density of about 1.8 g/cm$^3$, about 20 l of dilute sulfuric acid having specific gravity of about 1.15, 0.7% by weight of an inorganic expander (barium sulfate) as an additive, a predetermined amount of the carbon and a predetermined amount of the organic expander were kneaded. After a grid was filled with the kneaded paste, curing and drying were carried out to thereby obtain the aforementioned eight kinds of negative electrode plates. Incidentally, barium sulfate and the kneading solution (dilute sulfuric acid) can be changed correspondingly to the purpose of use of the battery so that, generally, the range of barium sulfate may be from 0 to 2% by weight and the specific gravity and liquid amount of dilute sulfuric acid may be selected suitably so long as the paste state adapted for filling can be maintained.

Though not used in this example, an electrode plate reinforcer such as synthetic fiber or the like may be added when the grid has large meshes or when the electrode plate requires large strength. The amount of the electrode plate reinforcer added is generally from 0.05% to 0.2%.

Here, the negative electrode plate No. 1 is a conventional plate prepared by adding 0.1% by weight of lignin and 0.2% by weight of acetylene black as carbon. The negative electrode plates 2 to 8 are plates prepared by increasing the amount of lignin to 0.5% by weight in order to improve the high-rate discharging characteristic. Of these plates, the negative electrode plate No. 2 is a plate prepared by setting the amount of carbon as in the conventional case (acetylene black: 0.2% by weight). The negative electrode plates No. 3 to 8 are plates prepared by increasing the amounts of the three kinds of carbon to 1% by weight in order to improve the charge acceptance. That is, the negative electrode plate No. 3 is a plate prepared by adding 1% by weight of acetylene black, the negative electrode plate No. 4 is a plate prepared by adding 1% by weight of thermal black, and the negative electrode plates No. 5 to 8 are plates prepared by adding 1% by weight of graphite having mean particle sizes of 70, 30, 10 and 5 μm, respectively.

Although an expanded metal grid formed from a Pb alloy containing 0.07% by weight of Ca and 0.5% by weight of Sn was used as the negative electrode grid in this example, a cast grid as generally used in a lead storage battery may be used. Further, any alloy such as a Pb—Sb alloy, etc., other than the Pb—Ca(—Sn) alloy may be used as the grid alloy.

On the other hand, as the positive electrode paste, used was a mixture prepared by kneading 100 kg of leady oxides containing about 75% by weight of PbO and about 25% by weight of metallic Pb and having apparent density of about 1.8 g/cm$^3$ and about 25 l of dilute sulfuric acid having specific gravity of about 1.15. Red lead may be added to the positive electrode paste in order to improve forming efficiency and/or synthetic fiber having a length of about 1 mm to about 5 mm may be added to the positive electrode paste in order to improve the strength of the electrode plate. The amount of synthetic fiber added is suitably in the range of about 0.1% to 0.3% by weight.

After the lead alloy grid was filled with the aforementioned positive electrode paste, curing and drying were carried out thus to obtain a positive electrode plate. Although the grid used in this example is a cast grid formed from a Pb alloy containing 0.07% by weight of Ca and 1.5% by weight of Sn, reduction in cost can be attained if an expanded metal grid is used. Further, as the grid alloy used for the positive electrode, there can be used any alloy such as a Pb—Ca(—Sn) alloy, a Pb—Sb alloy, etc. generally used in a lead storage battery.

These negative and positive electrode plates and separators were laminated to thereby produce a valve regulated lead storage battery for an electric vehicle with a nominal voltage of 12 V and a 3-hour-rate nominal capacity of 50 Ah. That is, eight kinds of lead storage batteries only different in the negative electrode plate were obtained as shown in Table 2. Here, the batteries No. 1 to 8 correspond to the negative electrode plates No. 1 to 8, respectively. Incidentally, the specific gravity of sulfuric acid after formation in the battery container was controlled to be 1.30 at 20° C. As the separator, used was a retainer mat prepared by sheet-making fine glass fiber having a diameter of about 1 μm.

TABLE 2

| BATTERY NO. | NEGATIVE ELECTRODE NO. | 3-HOUR-RATE DISCHARGING CAPACITY (Ah) | HIGH-RATE DISCHARGING CAPACITY | NOTE |
| --- | --- | --- | --- | --- |
| 1 | 1 | 50.1 | 28.2 | CONVENTIONAL ARTICLE |
| 2 | 2 | 43.5 | 31.3 | COMPARATIVE EXAMPLE |
| 3 | 3 | 51.0 | 25.2 | COMPARATIVE EXAMPLE |
| 4 | 4 | 46.5 | 30.6 | COMPARATIVE EXAMPLE |
| 5 | 5 | 48.5 | 30.5 | COMPARATIVE EXAMPLE |
| 6 | 6 | 50.2 | 30.3 | EXAMPLE |
| 7 | 7 | 51.4 | 30.4 | EXAMPLE |
| 8 | 8 | 51.8 | 30.3 | EXAMPLE |

These eight kinds of lead storage batteries were used to be first subjected to an initial capacity test. That is, the 3hour-rate discharging capacity and high-rate discharging capacity of each battery subjected to formation in the battery container were examined. The 3-hour-rate discharging capacity was obtained on the basis of the discharging duration in the case where the battery was discharged to a discharging end voltage of 9.9 V at a current of 16.7 A when the electrolyte temperature was 30±2° C. Further, the high-rate discharging capacity was obtained on the basis of the discharging duration in the case where the battery was discharged to a discharging end voltage of 6 V at 250 A when the electrolyte temperature was 30±2° C. The test results thereof are shown in Table 2.

With respect to the initial 3-hour-rate discharging capacity, the capacities of the comparative batteries No. 2, 4 and 5 were inferior to the capacity of the conventional battery 1. The capacities of the batteries No. 6 to 8 according to the present invention and the capacity of the comparative battery No. 3 were substantially equal to the capacity of the conventional battery 1.

It is considered that formation of the negative electrode plate during the formation of the battery container was not carried out sufficiently in the battery No. 2 because only the amount of lignin was increased so that the charge acceptance was lowered. Further, it is considered that the formation of the negative electrode plate was not carried out sufficiently in the batteries No. 4 and 5 in the same manner as in the battery No. 2 because the lowering of the charge acceptance caused by the increase in the amount of lignin could not be suppressed by the added carbon. On the other hand, it was thought that each of the batteries No. 6 to 8 and the battery No. 3 exhibited a 3-hour-rate discharging capacity substantially equal to that of the battery 1 with no increase in the amount of lignin because the lowering of the charge acceptance caused by the increase in the amount of lignin was suppressed by the added carbon.

With respect to the high-rate discharging capacity, the capacities of all the comparative batteries No. 2, 4 and 5 and the capacities of all the batteries No. 6 to 8 according to the present invention were superior to the capacity of the conventional battery No. 1. The capacity of the conventional battery No. 3 was inferior to the capacity of the conventional battery No. 1.

It is considered that the high-rate discharging capacities of the batteries No. 2, 4 and 5 and of the batteries No. 6 to 8 were superior because the high-rate discharging characteristic were improved by the increase in the amount of lignin.

On the other hand, it is considered that the discharging capacity of the battery No. 3 with the increase in the amount of lignin was inferior to the battery 1 with no increase in the amount of lignin similarly because lignin was adsorbed by 1% by weight of acetylene black added so that the effect of lignin was not obtained.

Then, the same batteries were subjected to a charging/discharging cycle life test. That is, after the cycle in which discharging was carried out for 2.4 hours at a current of 16.7±0.05 A and then charging was carried out for 8.4 hours at a current of 5.0±0.05 A while the storage battery ambient temperature was set 50±2° C. was repeated 50 times, the 3-hour-rate discharging capacity and high-rate discharging capacity of each battery were measured in the condition in which the electrolyte temperature was set to 30±2° C. These measurements were repeated unless the 3-hour-rate discharging capacity obtained per 50 cycles reached 80% or less (40 Ah or less) of the nominal capacity.

The results of the charging/discharging cycle life test are shown in FIG. 1. The 3-hour-rate discharging capacity in each of the comparative batteries No. 2 and 4 inferior in the initial 3-hour-rate discharging capacity was lowered earlier than the conventional battery No. 1. The comparative battery No. 5 exhibited the same passage of the 3-hour-rate discharging capacity as in the conventional battery. Each of the comparative battery No. 3 and the batteries No. 6 to 8 according to the present invention exhibited an excellent 3-hour-rate discharging capacity even after 500 charging/discharging cycles had passed.

It is considered that the 3-hour-rate discharging capacity of the battery No. 2 was lowered in an early stage of the life test because the lowering of the charge acceptance was brought about only by the increase in the amount of lignin in the battery No. 2 so that charging was not carried out sufficiently in each cycle and, accordingly, accumulation of lead sulfate in the negative electrode plate, so-called sulfation occurred. Similarly, it is considered that the capacity of the battery No. 4 having the 3-hour-rate discharging capacity lowered in an early stage was lowered by sulfation of the negative electrode plate in the same manner as in the battery No. 2 because the lowering of the charge acceptance caused by the increase in the amount of lignin was not compensated by the carbon added. It is considered that the battery No. 5 exhibited the same life performance as the battery No. 1 with no increase in the amount of lignin because the lowering of the charge acceptance at the time of the increase in the amount of lignin was balanced with the effect of the carbon for suppressing the lowering of the charge acceptance.

On the other hand, it is considered that the life performance in each of the battery No. 3 and the batteries No. 6 to 8 exhibiting the excellent passage of the 3-hour-rate discharging capacity was improved greatly, because since thin graphite is sufficiently added, the effect of carbon for suppressing the lowering of the charge acceptance exceeds the lowering of the charge acceptance at the time of the increase in the amount of lignin.

With respect to the passage of the high-rate discharging capacity, the capacity in each of the comparative battery No. 3 and the conventional battery No. 1 was lowered to 80% or less of the initial capacity within 100 cycles. On the other hand, each of the comparative batteries No. 2, 4 and 5 and the batteries No. 6 to 8 according to the present invention substantially exhibited 80% or more of the initial capacity even after 200 cycles had passed. Among these batteries, the comparative batteries No. 2 and 4 substantially exhibiting the same passage of the capacity were removed from the life test at the 200th cycle and the 250th cycle respectively due to the lowering of the 3-hour-rate discharging capacity. Particularly the comparative battery No. 5 and the batteries No. 6 to 8 according to the present invention were excellent in the high-rate discharging capacity so that each of these batteries exhibited 80% or more of the initial capacity even after 400–500 cycles had passed.

It is considered that the conventional battery No. 1 brought about the lowering of the capacity at an early stage because the temperature in the life test was a high temperature of 50° C. so that lignin added was decomposed or dissolved in an early stage and, accordingly, the effect of lignin for improving the high-rate discharging characteristic was eliminated simultaneously. It is considered that the battery No. 2 exhibited the good passage of the high-rate discharging capacity because the amount of lignin was increased so that a sufficient amount of lignin still remained even in the case where decomposition or dissolution of lignin advanced. It is considered the reason why the battery No. 3, in spite of the increase in the amount of lignin, exhibited the same high-rate discharging characteristic as the battery No. 1 with no increase in the amount of lignin because the added lignin was adsorbed by 1% by weight of acetylene black added so that the effect of lignin for improving the high-rate discharging characteristic was lowered. It is considered that the battery No. 4 having 1% by weight of carbon added in the same manner as in the battery No. 3 exhibited substantially the same passage of the high-rate discharging capacity as in the battery No. 2 having 0.2% by weight of carbon added because the carbon added to the battery No. 2 did not adsorb lignin. On the other hand, it is considered that the batteries No. 5 to 8 having graphite added exhibited more excellent high-rate discharging capacities than that of the battery No. 2 which was equal in the amount of lignin to the batteries No. 5 to 8 and having no increase in the amount of carbon because graphite did not adsorb lignin and because of the effect of the high conductivity of added graphite.

In such a manner, the batteries No. 6 to 8 according to the present invention were excellent both in 3-hour-rate discharging capacity and in high-rate discharging capacity in an initial stage and in the life test. In other words, it was found that an unexpected effect was obtained by using a negative electrode plate prepared by adding graphite powder having a mean particle size not larger than 30 $\mu$m so that both excellent initial performance and excellent life performance were exhibited.

Example 2

The same lignin as that was used in Example 1 was used as an organic expander and the amount of lignin added was selected to be 0.5% by weight as the ratio of the negative electrode active material. Further, graphite was used as carbon and the amount of graphite added was variously changed to 0.2%, 0.3%, 1% and 2% by weight to thereby obtain four kinds of negative electrode plates shown in Table 3.

TABLE 3

| NEGATIVE ELECTRODE NO. | AMOUNT OF ADDED LIGNIN (wt %) (RATIO RELATIVE TO NEGATIVE ELECTRODE ACTIVE MATERIAL) | KIND AND AMOUNT OF ADDED CARBON [(wt %) (RATIO RELATIVE TO NEGATIVE ELECTRODE ACTIVE MATERIAL) | NOTE |
|---|---|---|---|
| 1 | 0.1 wt % | 0.2 wt % OF ACETYLENE BLACK | CONVENTIONAL ARTICLE |
| 7 | 0.5 wt % | 1.0 wt % OF GRAPHITE WITH MEANS PARTICLE SIZE OF 10 $\mu$m. | EXAMPLE |
| 9 | 0.5 wt % | 2.0 wt % OF GRAPHITE WITH MEANS PARTICLE SIZE OF 10 $\mu$m. | EXAMPLE |
| 10 | 0.5 wt % | 0.3 wt % OF GRAPHITE WITH MEANS PARTICLE SIZE OF 10 $\mu$m. | EXAMPLE |
| 11 | 0.5 wt % | 0.2 wt % OF GRAPHITE WITH MEANS PARTICLE SIZE OF 10 $\mu$m | COMPARATIVE EXAMPLE |

In order to make comparison, a conventional negative electrode plate prepared by adding 0.1% by weight of lignin as an organic expander and 0.2% by weight of acetylene black as carbon was subjected to a test together with the aforementioned negative electrode plates.

That is, the negative electrode plate No. 1 is a conventional plate prepared by adding 0.1% by weight of lignin and adding 0.2% by weight of acetylene black as carbon. The negative electrode plate No. 7 and the negative electrode plates No. 9 to 11 are plates prepared by increasing the amount of lignin to 0.5% by weight in order to improve the high-rate discharging characteristic and adding 1%, 2%, 0.3% and 0.2% by weight of graphite having a mean particle size of 10 $\mu$m respectively. Incidentally, the negative electrode plates No. 1 and 7 are the same plates as used in Example 1.

Batteries were assembled by use of those members and subjected to a test in the same manner as in Example 1.

Incidentally, the batteries No. 1 and 7 and the batteries No. 9 and 11 correspond to the negative electrode plates No. 1 and 7 and the negative electrode plates No. 9 to 11, respectively. Initial 3-hour-rate discharging capacities and initial high-discharging capacities were shown in Table 4 and results of the charging/discharging cycle life test were shown in FIG. 2.

TABLE 4

| BATTERY NO. | NEGATIVE ELECTRODE NO. | 3-HOUR-RATE DISCHARGING CAPACITY (Ah) | HIGH-RATE DISCHARGING CAPACITY | NOTE |
| --- | --- | --- | --- | --- |
| 1 | 1 | 50.1 | 28.2 | CONVENTIONAL ARTICLE |
| 7 | 7 | 51.4 | 30.4 | COMPARATIVE EXAMPLE |
| 9 | 9 | 50.8 | 30.7 | COMPARATIVE EXAMPLE |
| 10 | 10 | 50.7 | 30.8 | COMPARATIVE EXAMPLE |
| 11 | 11 | 47.9 | 31.0 | COMPARATIVE EXAMPLE |

With respect to the initial 3-hour-rate discharging capacities shown in Table 4, only the comparative battery No. 11 was inferior to the conventional battery No. 1. The capacity in each of the batteries No. 7, 9 and 10 according to the present invention was equal to the capacity of the conventional battery No. 1.

As the cause of these facts, it is considered that the initial capacity of the battery No. 11 was small because the lowering of the charge acceptance caused by the increase in the amount of lignin could not be suppressed by the added carbon so that formation of the negative electrode plate was not carried out sufficiently. On the other hand, it is considered that each of the batteries No. 7, 9 and 10 exhibited the same 3-hour-rate discharging capacity as the battery No. 1 with no increase in the amount of lignin because the lowering of the charge acceptance caused by the increase in the amount of lignin was suppressed by the added carbon.

With respect to the high-rate discharging capacities, the comparative battery No. 11 and the batteries No. 7, 9 and according to the present invention were superior to the conventional battery No. 1. It is considered that this was because the high-rate discharging capacity was improved by the increase in the amount of lignin.

Figure 2:
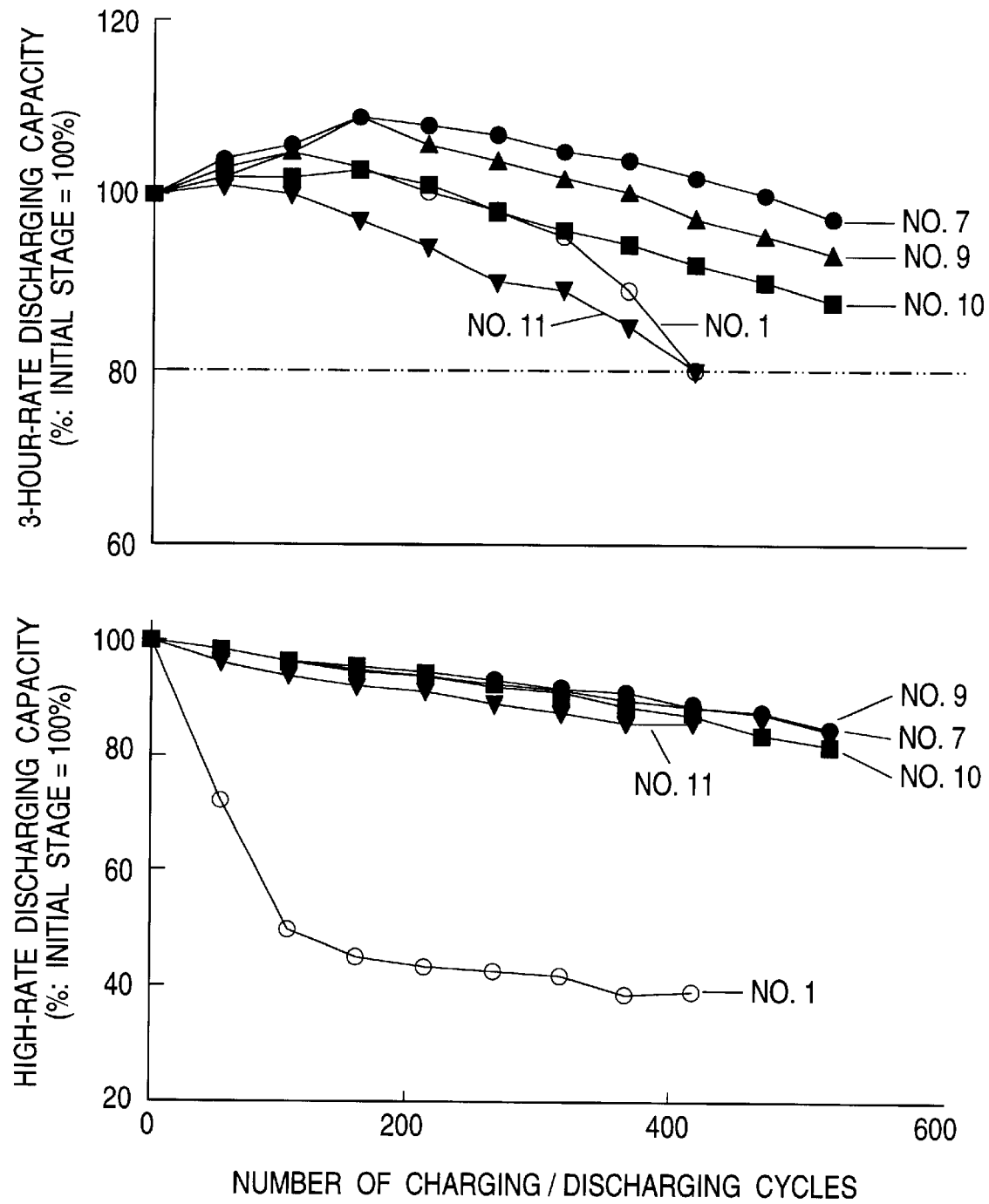
FIG. 2 shows results of a life test in Example 2.

In the charging/discharging cycle life test shown in FIG. 2, the conventional battery No. 11 inferior in initial 3-hour-rate discharging capacity exhibited the same passage of the 3-hour-rate discharging capacity as the conventional battery No. 1. Each of the batteries No. 7, 9 and 10 according to the present invention exhibited an excellent 3-hour-rate discharging capacity even after. 500 charging/discharging cycles had passed.

It is considered that the 3-hour-rate discharging capacity of the battery No. 11 was equal to that of the battery No. 1 because the amount of graphite in the battery No. 11 was small so that the lowering of the charge acceptance caused by the increase in the amount of lignin could not be suppressed and, accordingly, the capacity was lowered by accumulation of lead sulfate in the negative electrode plate, that is, so-called sulfation.

On the other hand, it is considered that the life performance in each of the batteries No. 7, 9 and 10 exhibiting the excellent passage of the 3-hour-rate discharging capacity was improved, because since thin graphite is sufficiently added, the effect of carbon for suppressing to lower the charge acceptance exceeds the lowering of the charge acceptance at the time of the increase in the amount of lignin.

In the passage of the high-rate discharging capacity, the capacity of the conventional battery No. 1 was lowered to 80% or less of the initial capacity within 100 cycles. The comparative battery No. 11 and the batteries No. 7, 9 and 10 according to the present invention, however, generally exhibited 80% or more of the initial capacity even after 400–500 cycles had passed. Incidentally, the comparative battery No. 11 was removed from the life test at the 400th cycle because of the lowering of the 3-hour-rate discharging capacity.

It is considered that the conventional battery No. 1 brought about the lowering of the capacity in an early stage because the temperature in the life test was a high temperature of 50° C. so that the added lignin was decomposed or dissolved in an early stage and, accordingly, the effect of lignin for improving the high-rate discharging characteristic was eliminated simultaneously. It is considered that each of the battery No. 7 and the batteries No. 9 to 11 exhibited the good passage of the high-rate discharging capacity because the amount of lignin was increased so that a sufficient amount of lignin still remained even in the case where decomposition or dissolution of lignin advanced to a some extent.

In such a manner, the batteries No. 7, 9 and 10 according to the present invention were excellent both in 3-hour-rate discharging capacity and in high-rate discharging capacity in an initial state and in the life. In other words, it was found that an unexpected effect was obtained by using a negative electrode plate prepared by adding 0.3% to 2% by weight of graphite powder having a mean particle size not larger than 30 μm so that both excellent initial performance and excellent life performance were exhibited.

Though not shown in this example, when a negative electrode plate prepared by adding 3% by weight or more of graphite powder was used, the negative electrode plate was inferior to that of the conventional battery both in the initial 3-hour-rate discharging capacity and in the initial high-rate discharging capacity. It is considered that this was because the amount of graphite powder in the electrode became large so that the amount of an active material became small.

Although this example has shown the case where lignin, that is, Na salt of sulfite lignin is used as an organic expander, other materials such as acid type of sulfite lignin, kraft lignin, polystyrene sulfonic acid, etc. which are recognized to have the effect as an organic expander may be also used. Although this example has shown the case where vein graphite powder is used as graphite, flake and other-graphite powder may be also used.

Although the effect of the present invention has been described in the Examples 1 and 2 upon the results of the test using valve regulated type batteries for electric vehicles, the same effect is obtained also in flooded type lead storage batteries.

Although the results of the cycle life test at a high temperature have been described in detail in the Examples 1 and 2, the life performance of the negative electrode plate according to the present invention is apparently excellent also in other tests such as a cycle test at a low temperature and a float charging life test in comparison with the conventional battery and the comparative battery.

In such a manner, the effect of the present invention described above in the Examples 1 and 2 is not changed in accordance with the form of the lead storage battery and the test method thereof so that the effect can be used for various kinds of lead storage batteries and for various kinds purposes.

Example 3

The same lignin as that described in Example 1 was used as an organic expander and the amount of lignin added was selected to be 0.2%, 0.3% and 0.5% by weight as the ratio of a negative electrode active material. Further, graphite was used as carbon and the amount of graphite added was selected to be 1% by weight to thereby obtain three kinds of negative electrode plates shown in Table 5.

In order to make comparison, a conventional negative electrode plate prepared by adding 0.1% by weight of lignin as an organic expander and 0.2% by weight of acetylene black as carbon was subjected to a test together with the aforementioned negative electrode plates.

Namely, the negative electrode plate No. 1 is a conventional plate prepared by adding 0.1% by weight of lignin and adding 0.2% by weight of acetylene black as carbon. The negative electrode plates No. 7, 12 and 13 are plates prepared by increasing the amount of lignin to 0.2%, 0.3% and 0.5% by weight respectively and adding 1% by weight of graphite having a mean particle size of 10 $\mu$m. The negative electrode plates No. 1 and 7 were the same plates as those used in Example 1.

Batteries were assembled by using these plates in the same manner as in Example 1 and subjected to a test. The batteries No. 1, 7, 12 and 13 correspond to the negative electrode plates No. 1, 7, 12 and 13, respectively. Initial 3-hour-rate discharging capacities and initial high-rate discharging capacities were shown in Table 6 and results of the charging/discharging cycle life test were shown in FIG. 3.

TABLE 6

| BATTERY NO. | NEGATIVE ELECTRODE NO. | 3-HOUR-RATE DISCHARGING CAPACITY (Ah) | HIGH-RATE DISCHARGING CAPACITY | NOTE |
| --- | --- | --- | --- | --- |
| 1 | 1 | 50.1 | 28.2 | CONVENTIONAL ARTICLE |
| 7 | 7 | 51.4 | 30.4 | EXAMPLE |
| 12 | 12 | 50.8 | 28.9 | EXAMPLE |
| 13 | 13 | 51.0 | 30.2 | EXAMPLE |

With respect to the initial 3-hour-rate discharging capacities shown in Table 6, the batteries No. 7, 12 and 13 according the present invention were equivalent to the conventional battery No. 1.

On the other hand, in the high-rate discharging capacities, the batteries No. 7 and 13 according to the present invention were all superior to the conventional battery No. 1. It is considered that this was because the high-rate discharging characteristic was improved by the increase in the amount of lignin. The battery No. 12 was equivalent to the conventional battery.

Figure 3:
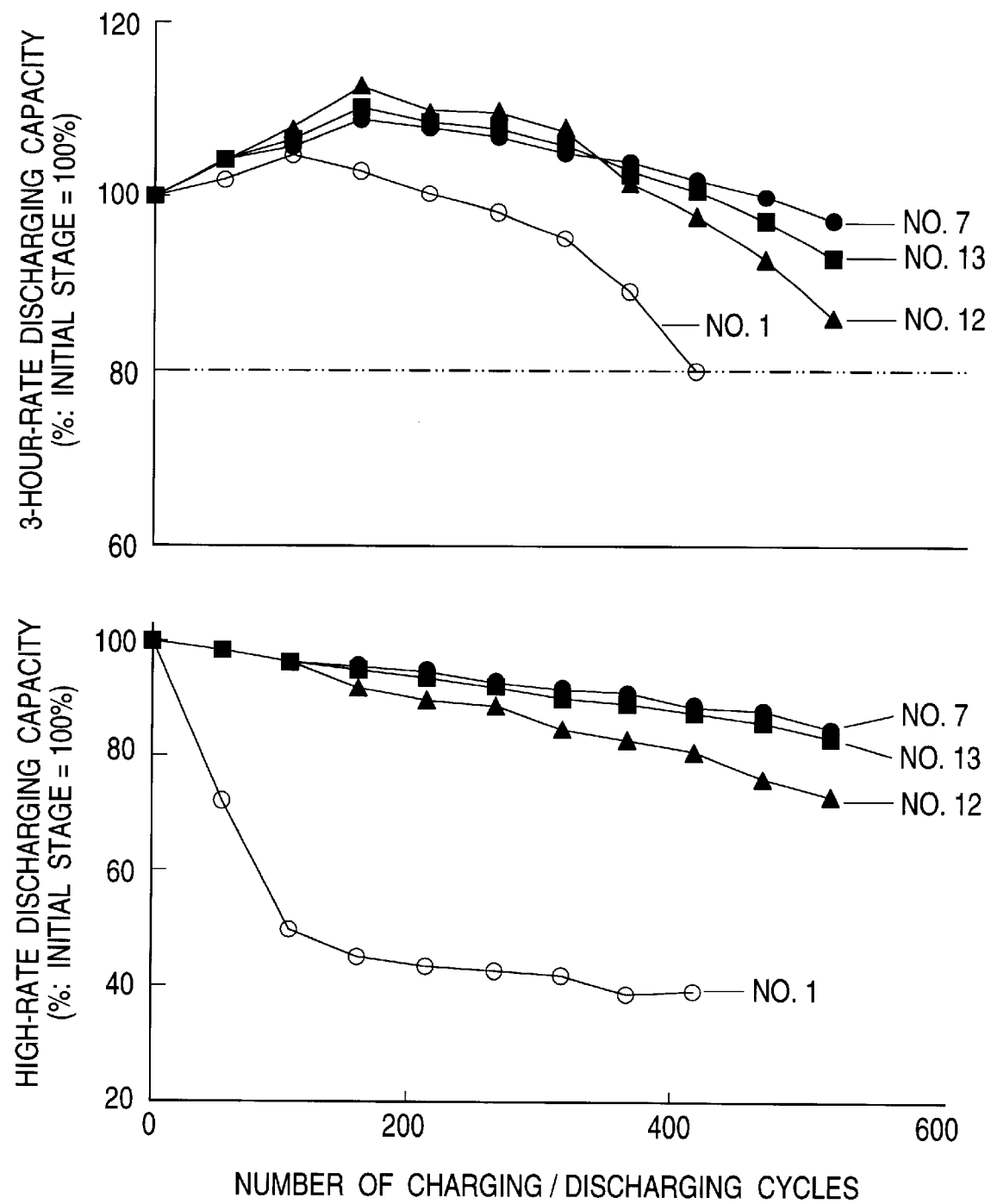
FIG. 3 shows results of a life test in Example 3.

With respect to the charging/discharging cycle life test shown in FIG. 3, the batteries No. 7, 12 and 13 according to the present invention exhibited excellent 3-hour-rate dis-

TABLE 5

| NEGATIVE ELECTRODE NO. | AMOUNT OF ADDED LIGNIN (wt %) (RATIO RELATIVE TO NEGATIVE ELECTRODE ACTIVE MATERIAL) | KIND AND AMOUNT OF ADDED CARBON [(wt %) (RATIO RELATIVE TO NEGATIVE ELECTRODE ACTIVE MATERIAL) | NOTE |
| --- | --- | --- | --- |
| 1 | 0.1 wt % | 0.2 wt % OF ACETYLENE BLACK | CONVENTIONAL ARTICLE |
| 7 | 0.5 wt % | 1.0 wt % OF GRAPHITE WITH MEANS PARTICLE SIZE OF 10 $\mu$m. | EXAMPLE |
| 12 | 0.2 wt % | 1.0 wt % OF GRAPHITE WITH MEANS PARTICLE SIZE OF 10 $\mu$m. | EXAMPLE |
| 13 | 0.3 wt % | 1.0 wt % OF GRAPHITE WITH MEANS PARTICLE SIZE OF 10 $\mu$m. | EXAMPLE | charging capacities even after 500 charging/discharging cycles had passed.

In the passage of the high-rate discharging capacity, the capacity of the conventional battery No. 1 was lowered to 80% or less of the initial capacity within 100 cycles. The batteries No. 7, 12 and 13 according to the present invention generally exhibited 80% or more of the initial capacity even after 500 cycles had passed. Of these batteries, the battery No. 12 was slightly inferior in the passage of the capacity.

It is considered that the conventional battery No. 1 brought about the lowering of the capacity in an early stage because the temperature in the life test was a high temperature of 50° C. so that the added lignin was decomposed or dissolved in an early stage and, accordingly, the effect of lignin for improving the high-rate discharging characteristic was eliminated simultaneously. It is considered that each of the batteries No. 7 and 13 exhibited the good passage of the high-rate discharging capacity because the amount of lignin was increased so that a sufficient amount of lignin still remained even in the case where decomposition or dissolution of lignin advanced to a some extent. It is considered that the battery No. 12 was slightly inferior in the passage of the capacity because the amount of lignin was small.

In such a manner, both 3-hour-rate discharging capacity and high-rate discharging capacity particularly in an early stage and in the life were made excellent by adding 0.3% or more by weight of lignin as an organic expander.

As described above, according to the present invention, a negative electrode plate for a lead storage battery prepared by adding graphite powder having a mean particle size not larger than 30 µm, preferably setting the amount of graphite added to be in a range of from 0.3% to 2% by weight, preferably using vein graphite powder as the graphite powder and more preferably adding 0.3% or more by weight of an organic expander is used, so that not only the initial battery performance can be improved but also the life performance can be improved on the basis of prevention of the lowering of the high-rate discharging capacity under a high temperature. Thus, the industrial value thereof is very large.

What is claimed is:

1. A negative electrode plate for a lead acid battery comprising:

a negative electrode active material;

vein graphite powder having a mean particle size not larger than 30 µm;

the amount of the vein graphite powder is in the 0.3 to 2% by weight of the negative electrode active material and 0.3% by weight or more of an organic expander.

* * * * *